United States Patent [19]
Gerardin et al.

[11] 3,952,150
[45] Apr. 20, 1976

[54] VISUALIZATION OF VIBRATIONS, DEFORMATIONS OR LEVEL LINES OF A THREE-DIMENSIONAL OBJECT

[75] Inventors: Jean Pierre Gerardin, Nanterre; Benjamin Dessus, Meudon, both of France

[73] Assignee: Electricite de France (Service National), Paris, France

[22] Filed: July 12, 1974

[21] Appl. No.: 488,061

[30] Foreign Application Priority Data
July 19, 1973 France .............................. 73.26585

[52] U.S. Cl. ............................ 178/6.8; 178/DIG. 36
[51] Int. Cl.² .......................................... H04N 7/18
[58] Field of Search ................ 178/6.5, 6.8, DIG. 36

[56] References Cited
UNITED STATES PATENTS
3,814,521   6/1974   Free .................................... 356/156

Primary Examiner—Howard W. Britton
Attorney, Agent, or Firm—Diller, Brown, Ramik & Wight

[57] ABSTRACT

The present invention relates to a method of and apparatus for enabling the visualization of isometric physical condition maps of a three-dimensional test object, the physical condition being for example the amplitude of vibration of the test object or the contour of the object. The latter is studied by the striation method whereby flat parallel light beams on light on the object forming a system of striations thereon; there is superimposed on the image in a given direction of the illuminated object a corresponding image of a typical comparison object, the resultant superimposed image being a coded representation of the physical condition of the test object. A television camera is used to analyze the successive images of the system of striations formed on the surface of the object. The modulation signal is separated from the synchronizing signals, filtered and demodulated so as to reproduce in real time on a viewing device or control receiver an isometric physical condition map of the object with free from the structure.

13 Claims, 10 Drawing Figures

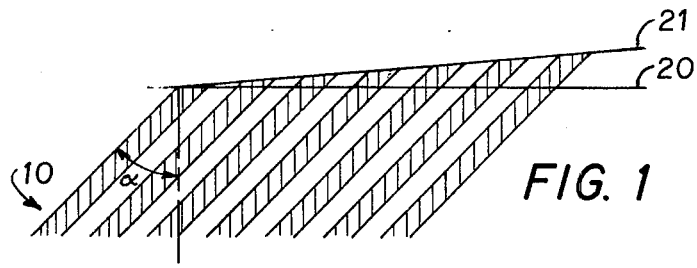
FIG. 1
FIG. 1a
FIG. 1b
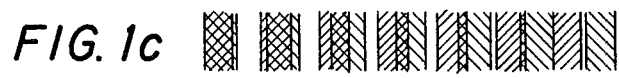
FIG. 1c
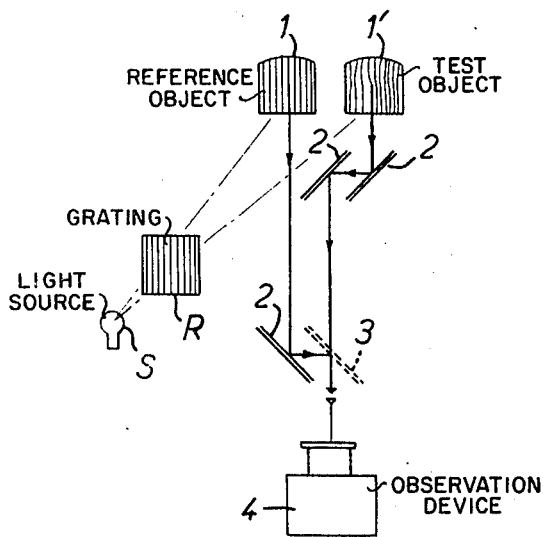
FIG. 2
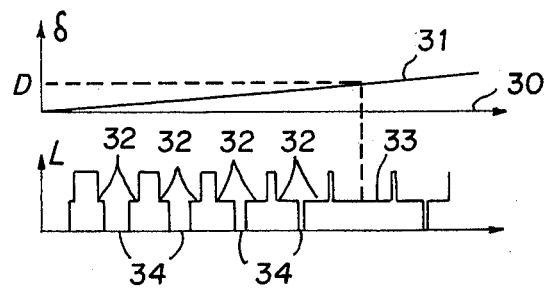
FIG. 3a
FIG. 3b

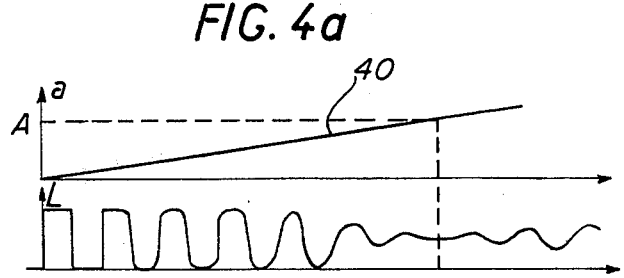
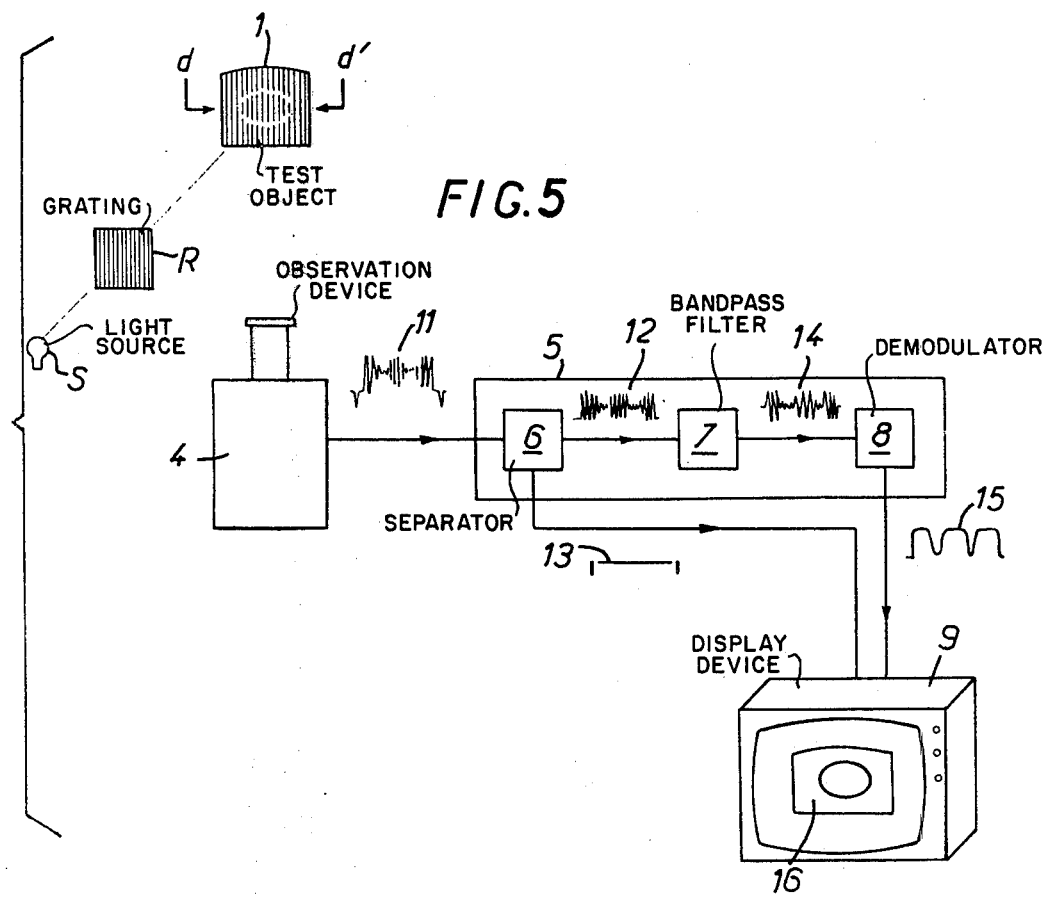

VISUALIZATION OF VIBRATIONS, DEFORMATIONS OR LEVEL LINES OF A THREE-DIMENSIONAL OBJECT

The present invention relates to a method and apparatus for obtaining a visual representation of the physical state or condition (e.g. condition of vibration or physical contour) of a three-dimensional test object, in the form of easily readable isometric maps.

The presentation of the geometrical characteristics of a three-dimensional object, and the representation of these characteristics in the form of a two-dimensional image including, in parametric form, the data or conditions relating to the third dimension, have formed the subject of numerous studies.

A convenient expression of these data or conditions relating to the third dimension is obtained by the representation of the geometrical loci of the points having an equal state or condition. By analogy with geographical maps, such representations may be termed isometric maps or contour maps. These data or conditions relating to the third dimension of the test object may be the amplitude of vibrations of this object, the deformation of the object under the effect of stresses, or the differences between this third dimension and a reference object; this reference object may have the same general shape as the test object to be observed, or be a reference plane. In this latter case, a contour map obtained will be the map of height of the test object in the third dimension.

In order to obtain isometric maps generally, it is usual to have recourse to optical methods, which give a flat representation test whole of the object in the field of observation. Amongst the optical methods, interferometer methods make it possible to obtain physical condition maps comparing the test object with a reference object, such as for example the Newton rings utilized for bringing out irregularities in flatness or sphericity of optical parts. These interferometer methods are remarkably accurate, but are only applicable to static measurements and can only measure small differences in surface regularity which do not exceed a few wavelengths in white light and a few ten of wavelengths of incoherent monochromatic light. The field of application of these methods is therefore restricted.

The utilization of coherent light, capable of providing interferences for working with differences of several meters or more, and especially in holography, has made it possible to widen considerably the field of application of the studies of the three-dimensional characteristics of objects. However, due to the precision obtained, which is of the order of a fraction of a wave-length, all the equipment employed must be produced with still greater precision, both from the point of view of rigidity and absence of vibrations and from the point of view of uniformity of surfaces. These methods have little flexibility and are very expensive, while the precision of the results which they give is frequently unnecessary.

Industrial methods have been developed for the study of three-dimensional structures, known by the name of striation or fringe methods, which consist of lighting the test object by means of a light structure formed as equidistant flat parallel beams equally spaced apart; the spacing between adjacent beams is generally equal to the thickness of a beam.

The light structure of parallel beams strikes the surface of the test object and gives rise to a system of substantially parallel and equidistant striations, the irregularities of the system of striations being characteristic of the irregularities of the surface of the test object. In particular, if the flat parallel beams are oblique with respect to the plane of observation which will be the plane of the map, the striations appear to be in a plane displaced with respect to the position in the plane of the map, by an amount proportional to the distance of the surface of the test object to the plane of the map, and normal to this plane.

In order to show the displacements of striations due to distances from the surface to the plane of the map, the image of a system of striations on a reference object is generally superimposed on the image of the system of striations on the test object.

The reference object may be an object of the same general shape as the test object, if it is desired to show, for example, errors of manufacture. The object may be a physical plane considered to be perfect, if it is desired to determine the isometric lines of the test object. The superimposition of the images of two systems of striations is obtained by a combination of mirrors and semi-transparent plates suitably arranged.

The local differences between the images of systems of striations resulting from the surface or contour differences in the test object are revealed as local imperfections in superimposition. For small differences, there will be obtained striations bordered with zones of semi-darkness or penumbra zones. If the imperfections in superimposition reach locally the inter-beam spacing of the system formed on the test object, the entire zone of an image will become semi-dark and the structure of striations will effectively disappear at this zone. If the difference of condition further increases, there will be obtained a series of disappearances of the structure of striations on the superimposition image, this series being characterized by a shift of an odd number of inter-beam spacings between the systems of striations.

If $p$ is the width of the light beam of the system of striations and $\alpha$ is the angle of incidents of this beam with respect to the normal plane of the reference object the difference in contour S of the test object with respect to the reference plane characterized by the merging of the system of striations will be given by $$S = (2k + 1) \frac{p}{2 \sin \alpha},$$

$k$ being a whole number.

For the study of the vibratory condition of a test object by the striation method, it is unnecessary to have available a non-vibrating reference object. In this case, the systems of striations corresponding to the successive positions of the points of the test object during a period of vibration are superimposed by integration over time. The vibratory condition of the points on the object is then shown by zones of half-darkness where there are discontinuities in the system of striations formed on the test object, these zones being analogous to those which are obtained in a static study by the superimposition of the images of the two systems the system of striations on the test object and that on the reference object.

There also exist values of amplitude of vibration which cause the disappearance of the striations or a merging of the semi-dark zones. When the vibration is substantially sinusoidal, the amplitudes characterized by the disappearance of striations are given by:

$$a = (k + \tfrac{3}{4}) \frac{P}{2 \sin \alpha}$$

The preparation of physical condition maps obtained by the striation method was in the past usually carried out with photographic negatives. Each photograph represents a physical condition map at a definite instant, and its use necessitates a certain delay, corresponding as a minimum to the time of development of the negative. It is thus not easy to carry out the study of a physical condition on an object if this study is to take into account the change of this physical condition during the course of time, and less so if it is desirable to control the physical condition during the course of the study of the test object, for example by carrying out local changes in the contour of the physical object.

Furthermore, the condition maps which are obtained by photographic negatives do not represent the show isometric lines of physical condition but only a coded representation thereof, lines of constant physical condition being shown as zones in which the system of striations, surrounded by zones in which this striated structure is more or less well defined, disappears. In order to obtain clearly defined isometric line maps, it is necessary to make a graphic transfer of the image on which the constant condition lines appearing on the photographic negative are drawn.

By comparison of two negatives in coherent light, it is possible to obtain decoded physical condition maps on which the constant condition lines actually appear. These methods thus necessitate two negatives and their comparison, which increases the delay before use of such physical condition maps. Such a method is furthermore subject to the usual precision constraints in the use of coherent light, and is for this reason very expensive.

The invention has for its object a method of enabling the visualization of an isometric condition map of a three-dimensional object illuminated by a light structure formed by flat parallel beams uniformly spaced-apart in carrying out the so-called striation method, this condition map being formed in real time.

To this end, the invention proposes a method of enabling the visualization of the condition map of a three-dimensional test object illuminated by a light structure formed by flat parallel beams, in which there is superimposed, on the image seen in a given direction of the said illuminated test object, a corresponding image on a reference object, so that the luminosity of the points of the resultant superimposed images are a coded representation of the physical condition of the said three-dimensional object or deviation of this test object from the said reference object. A scanning is performed in repeated sequence, of a succession of points of the said three-dimensional test object, so as to obtain coded condition information constituted by a signal which is a function of the luminosity of the said points. A repeated, homologous and analyzed map of physical condition is then reconstituted from the said coded condition information.

It will be understood that, following this method, the isometric condition map is at any moment an actual representation of the physical condition of all the points of the said test object, and that any variation in time of this condition will be indicated without delay.

The invention has also for its object a method of enabling visualization of the isometric condition map of a three-dimensional object, which offers the advantage of showing the isometric curves of the said three-dimensional object directly.

To this end, according to one of the characteristics of the method, the said coded condition information is decoded in repeated sequences, and the reconstitution of the said condition map is effected from this decoded information.

It will be understood that, following this method, the decoding of the condition information, carried out without delay, makes it possible to present on the image the decoded informations of which the isometric curves are the isometric condition curves.

The invention has also for its object a device for the enabling the visualization of the condition map of a three-dimensionsal test object by the application of the above method.

The characteristic features and advantages of the invention will furthermore be brought out in the description which follows below by way of example, reference being made to the accompanying drawings, in which:

FIG. 1 is a basic diagram showing the superimposition of systems of striations on a test object respectively and a reference object;

FIG. 2 shows diagrammatically a device permitting the optical superimposition of two systems of striations;

FIG. 3a shows a graph of a difference between contour (physical condition) of the test object and a reference object;

FIG. 3b shows a graph of the distribution of light intensity along a cross section of a resultant superimposed image;

FIG. 4a shows the amplitude of vibration increasing linearly from left to right;

FIG. 4b shows a graph of the distribution of light intensity of a cross section of the superimposed image of a test object vibrating with a linearly increasing amplitude;

FIG. 5 is a diagram of an apparatus for producing isometric condition maps.

In FIG. 1, a light structure formed of flat parallel beams 10 uniformly spaced apart, seen in this case in cross-section perpendicular to the planes of the beams, strikes the surface 20 of a reference object represented by a plane, and by the surface 21 of a test object to be compared with the reference object, and represented in this case by a plane inclined at an angle $\alpha$ with that preceding. The sub figure 1a represents the striated system obtained on the reference object and the sub-figure 1b the system obtained on the test object 1, while the sub-figure 1c represents the striated system resulting from the superimposition of the former system and the latter system.

In FIG. 2, a source of light S is projected through a grating R comprising equidistant parallel lines, so as to form alternately transparent and opaque striations on two objects, the reference object 1 and the test object 1', the physical condition (or contours here) of which it is desired to compare. The light source S is sufficiently distant from the grating R and the objects 1 and 1', so that the light structure obtained by the passage through the grating R of the light flux emitted by the source S may be considered as substantially flat parallel beams, uniformly spaced apart. The systems of striations obtained by the intersection with the objects 1 and 1' of the light structure transmitted by grating R are conveyed to the observation device or camera 4 by a set of three mirrors 2 and a semi-transparent plate 3. These mirrors are orientated in such manner that, when viewed from the observation device 4, the systems striations formed on the objects 1 and 1' are superimposed.

FIG. 3 shows the geometric distribution of the light intensity perpendicular to the systems of striations in the superimposed image resulting from the arrangement in FIG. 2. With respect to the contour of the reference object, that contour being indicated as 30 in FIG. 3a, the test object has a difference in contour, indicated as 31, which is increasing from left to right.

It can be seen from FIG. 3b (which is a graph of the distribution of light intensity along a cross section of the superimposed image resulting from the arrangement in FIG. 2) that the semi-darkness or penumbra zones 32 having a light intensity of half that of the striations, become progressively wider with increasing differences of contour between the reference and test objects until, for a critical value D of the difference, adjacent penumbra zones merge as indicated at 33, and this results in a local disappearance of the light striations 34.

FIG. 4 represents the geometric distribution of light intensity of the surface of a vibrating test object with an amplitude of vibration increasing from the left towards the right, as indicated by line 40 in FIG. 4a, this light intensity being integrated in time over one period of vibration. It can be seen from FIG. 4b (a graph of the light intensity distribution) that for zero amplitude of vibration the distribution is rectangular; as the amplitude increases, the flanks or edges of the distribution curve become rounded and then the curve takes a pseudo-sinusoidal form, the amplitude of which form decreases when as the vibration amplitude decreases. For a critical value A (see FIG. 4a) of the amplitude of vibration there is a disappearance of the light striations, the striations reappearing in an attenuated form for amplitudes of vibration greater than the critical value (see FIG. 4b).

According to the apparatus for carrying out the method of the invention, shown in FIG. 5, there is formed on a test object 1', of which it is desired to obtain the isometric physical condition map, a system of striations. The system is formed by illuminating this object 1' by a source S through a grating R.

In a first stage, the system of striations formed at the surface of the object 1' is scanned in repeated sequences by constant speed sweeping of line and frame, so as to obtain an electric signal of the video type given by a television camera. The appearance of such a signal, for a scanned line corresponding to the line d–d' on the test object 1' is that shown at 11, in which there is seen a video modulation bounded by synchronization signals which gives a coded representation of the object 1' along the analysis line d–d'. The video-type signal is now operated on by a series of circuits generally shown as 5.

In the stage 6, the synchronizing signals 13 which provide a reference system for each information of the point of the scanned line are separated from the modulation signals 12 which carry the physical condition information. In a further stage, the modulation signals 12 are filtered through a band-pass filter 7, the central band frequency of which corresponds to the fundamental carrier frequency $f^0$ of the signals obtained by the constant speed scan of the system of striations of the test object.

The output signal 14 from the filter system 7 is then a signal of frequency $f^0$ modulated by the condition information. In the next stage, this signal 14 is demodulated by demodulator 8 and there is obtained a signal 15 which has the form of the envelope of the signal 14, and the instantaneous amplitude of the signal 15 is characteristic of the condition of each corresponding point of the scanned image.

In final stage 9 there is formed, from the synchronization signals 13 and the condition physical information signal 15, by means of scanning synchronized with that of the contour scanning, an image 16 which corresponds to the system of striations on the surface of the test object 1', which constitutes the isometric physical condition map.

Although the preceding description corresponds to the study of the vibratory physical condition of the test object 1', in order to draw the lines of equal amplitude of vibration of that object (isometric lines), it is obvious that an analysis similar to the superimposition of two systems of striations, such as is obtained by utilizing the arrangement of FIG. 2, for the purpose of forming an isometric map of the compared physical conditions of two objects, does not fall outside the scope of the invention.

It is clear that the almost simultaneous nature of the scanning of the image of the system of striations and of the reconstitution of the image 16 which carries the curves of equal condition value of the object under study and the repetition in time of this image 16, permits a continuous and instantaneous real time observation of the physical condition of all of the points of the test object and therefore the observation of the changes of the physical condition of the object, whether such change depends on external causes, the influence of which may thus be appreciated, or on interventions of the operator in order to modify the physical condition of the object under study.

In addition, the demodulation of the signals carrying the physical condition information in order to give critical characteristic signals of physical condition, offers the advantage that the physical condition maps definitely and clearly shows the isometric curves of equal condition level of the object under study.

In fact, the filtering of the modulation signals 12 frees the image from erratic fluctuations which could result, for example, from local variations in the light-diffusion power of the object, and the demodulation eliminates the system of striations of the image, comparable to a quantification noise, and permits the presentation of an image whose points correspond to the characteristic physical condition are black, while the regions corresponding to differenet values of the characteristic physical condition are clear (that is to say, light in tone) and all the more so as the corresponding physical condition departs from the critical value of the same.

According to the form of embodiment of the invention chosen and shown above, the device or apparatus for the application of the method described above comprises a television camera 4 pointed on an object illuminated by a source S through a grating R. The video signal supplied by this camera 4 is sent to an electronic device represented generally by 5, and which comprises in series a so-called electronic separator circuit 6 adapted to separate, according to their respective levels, the synchronization signals 13 and the modulation signals 12; properly so-called, a band-pass filter 7, the central frequency of which is regulated on the fundamental frequency $f^o$ of the modulation signal and a demodulator circuit 8 constituted in accordance with one of the usual diagrams of detection stages in conventional television, and adapted to give a signal which has the form of the envelope of the modulated signals 14, this signal being freed from components having the modulation frequency $f^o$.

The synchronization signals 13 coming from the separator circuit 6 and the signals passing out of the demodulation circuit 8 are sent together to a visualization apparatus viewing device 9 so as to form an image in response to the synchronization signals 13 acting on the scanning circuit of the display device 9, and characteristic condition signals acting on the light-intensity control of this device 9.

A visualization apparatus of this kind may be constituted by a television receiver of the kind known by the name of the control receiver and utilized especially in closed-circuit television installations.

According to an advantageous or preferred form of the apparatus in accordance with the invention, the band-pass filter 7 is adjusted to a central frequency which is the fundamental frequency $f^o$ of the modulation and may be a filter with a controlled cut-off frequency of the kind described in the French Patent Application No. 73/2204 filed on June 19th 1973, the servo-control voltage of the frequency characteristic of this filter bag being associable either directly or indirectly with the fundamental frequency $f^o$ of modulation.

According to an advantageous or preferred alternative form which can be employed separately or in combination with the preceding alternative form of construction of the device according to the invention, the television camera 4 is equipped with an image tube having image remanence integrating the variations of light intensity of the points of the image, in order to prevent stroboscopic effects which would result from the combination of the scanning frequencies and the light-intensity variation frequencies of the points of the image.

In accordance with an advantageous or preferred alternative form of the invention, which can be utilized separately or in combination with the preceding alternatives, a video-signal recording device, for example a video recorder, may be coupled to the visualization apparatus 9 and may be adapted to record all of the synchronization signals 13 and the critical physical condition-characteristic signals 15 and subsequently to restore these recorded signals to the visualization apparatus 9 or to a similar apparatus, in such a manner as to reproduce as required the recorded image sequences.

What we claim is:

1. Method of producing, for visualization, an isometric map showing the physical characteristics of a three-dimensional test object with respect to a reference, said method comprising the steps of:
    a. projecting a plurality of flat, parallel light beams obliquely on said test object so as to form on said test object a system of spaced apart light striations, said system having irregularities which correspond to variances of said physical characteristics with respect to said reference;
    b. operating on said system so as to obtain an image which is characterized by a basic luminous structure which includes, when there are variances between said physical characteristics and said reference, local imperfections in correspondence to said variances;
    c. scanning said image in a repeated sequence and at a fixed rate so as to derive an electrical signal which includes a synchronization component corresponding to said fixed rate and a modulation component corresponding to said local imperfections;
    d. separating electrically said synchronization component and said modulation component;
    e. operating on said modulation component so as to produce a further signal having the form of an envelope of said modulation component; and
    f. utilizing said synchronization component and said further signal to form an image which is the isometric map of said test object.

2. A method as recited in claim 1 wherein step (b) comprises:
    vibrating said test object so as to provide successive images of said system of striations on said test object; and
    integrating said successive images over a period of time so as to obtain a reference system of striations superimposed on said system of striations, the resulting superimposition being said image.

3. A method as recited in claim 1 wherein step (b) comprises:
    positioning a reference object in the plane of said test object;
    projecting said plurality of flat, parallel beams obliquely on said reference object so as to form thereon a reference system of spaced apart light striations; and
    superimposing optically said system on said reference system so as to obtain said image.

4. The method as recited in claim 1 wherein step (e) comprises:
    filtering said modulation component so as to produce an output which has a carrier frequency corresponding to said fixed rate, said carrier frequency being modulated by said variances; and demodulating said output to obtain said further signal, the instantaneous amplitude of which is characteristic of said variances.

5. The method as recited in claim 1 wherein said physical characteristics constitute the contour of said test object.

6. The method as recited in claim 1 wherein said physical characteristics constitute the amplitude of vibration of said test object.

7. An apparatus for displaying an isometric map showing the physical characteristics of a three-dimensional test object with respect to a reference, said apparatus comprising:
    means for projecting a plurality of flat, parallel light beams obliquely on said test object so as to form on said test object a system of spaced apart light striations, said system having irregularities which correspond to variations of said physical characteristics with respect to said reference;
    means for operating on said system so as to obtain an image which is characterized by a basic luminous structure which includes, when there are variances between said physical characteristics and said reference, local imperfections in correspondence to said variances;

means for scanning said image in a repeated sequence and at a fixed rate so as to derive an electrical signal which includes a synchronization component corresponding to said fixed rate and a modulation component corresponding to said variances;

circuit means for processing said electrical signal so as to isolate said synchronization component and to produce a further signal which is the envelope of said modulation component; and display means for utilizing, said synchronization component and said further signal to produce an image which is the isometric map of said test object.

8. An apparatus as recited in claim 7 wherein said means for operating includes a vibrating means for vibrating said test object so as to provide successive images of said system of striations on said test object, and wherein said means for scanning is a television camera having a tube with high remanence so as to effectively integrate said successive images over a period of time and to obtain, as a result, a reference system of striations superimposed on said system of striations, the resulting superimposition being said image.

9. An apparatus as recited in claim 7 wherein said means for operating includes:

a reference object positioned in the plane of said test object so as to receive, simultaneously with said test object, said plurality of flat, parallel light beams obliquely projected thereon, said light beams acting to form, on said reference object, a reference system of spaced apart light striations; and optical means disposed between said test and said reference objects, on the one side, and said means for scanning, on the other side, so as to superimpose optically said system on said reference system and obtain said image.

10. An apparatus as recited in claim 7 wherein said means for projecting includes a light source for projecting a beam of light toward said test object, and a lined grating disposed between said light source and said test object so as to intercept said beam of light and produce therefrom said plurality of flat, parallel light beams.

11. An apparatus as recited in claim 7 wherein said means for scanning is a television camera, with line and frame scanning, aimed at said image.

12. An apparatus as recited in claim 7 wherein said circuit means includes:

a synchronization separator circuit for dividing said electrical signal into said synchronization component and said modulation component;

a band pass filter, the central frequency of which corresponds to the carrier frequency of said modulation component for acting on said modulation component to produce an output signal which is of said carrier frequency but modulated by said variances; and demodulator circuit for acting on said output signal from said band pass filter to produce said further signal which is free of components having said carrier frequency.

13. An apparatus as recited in claim 7 wherein said display means is a television display device having scanning means responsive to said synchronization component and brightness means responsive to said further signal so as to provide a display of said isometric map.

* * * * *